(12) United States Patent
Tankovich et al.

(10) Patent No.: US 8,171,031 B2
(45) Date of Patent: May 1, 2012

(54) INDEX OPTIMIZATION FOR RANKING USING A LINEAR MODEL

(75) Inventors: Vladimir Tankovich, Bellevue, WA (US); Dmitriy Meyerzon, Bellevue, WA (US); Mihai Petriuc, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 12/690,100

(22) Filed: Jan. 19, 2010

(65) Prior Publication Data

US 2010/0121838 A1   May 13, 2010

Related U.S. Application Data

(63) Continuation-in-part of application No. 12/147,666, filed on Jun. 27, 2008.

(51) Int. Cl.
*G06F 17/30* (2006.01)
(52) U.S. Cl. ........ 707/741; 707/708; 707/711; 707/742; 707/750
(58) Field of Classification Search .................. 707/708, 707/711, 740–750, 999.002
See application file for complete search history.

(56) References Cited

U.S. PATENT DOCUMENTS

| | | | |
|---|---|---|---|
| 5,404,514 A | 4/1995 | Kageneck et al. | |
| 5,893,092 A | 4/1999 | Driscoll | |
| 5,915,249 A | 6/1999 | Spencer | |
| 5,920,854 A | 7/1999 | Kirsch et al. | |
| 6,018,733 A | 1/2000 | Kirsch et al. | |
| 6,243,713 B1 | 6/2001 | Nelson et al. | |
| 6,363,379 B1 | 3/2002 | Jacobson et al. | |
| 6,523,030 B1 | 2/2003 | Horowitz | |
| 6,529,916 B2 | 3/2003 | Bergman et al. | |
| 6,701,318 B2 | 3/2004 | Fox et al. | |
| 6,738,760 B1 | 5/2004 | Krachman | |
| 6,738,764 B2 | 5/2004 | Mao et al. | |
| 6,862,713 B1 | 3/2005 | Kraft et al. | |
| 6,947,920 B2 | 9/2005 | Alpha | |
| 6,954,750 B2 * | 10/2005 | Bradford | 1/1 |
| 7,136,854 B2 | 11/2006 | Smith et al. | |
| 7,149,748 B1 * | 12/2006 | Stephan | 707/742 |
| 7,356,527 B2 | 4/2008 | Carmel et al. | |
| 7,415,445 B2 | 8/2008 | Forman | |

(Continued)

OTHER PUBLICATIONS

Agichtein et al., "Improving web Search Ranking by Incorporating User Behavior Information," ACm, SIGIR '06, Aug. 6-11, 2006, 8 pages.

(Continued)

*Primary Examiner* — Debbie Le
(74) *Attorney, Agent, or Firm* — Hope Baldauff Hartman, LLC (57) ABSTRACT

Technologies are described herein for providing a more efficient approach to ranking search results. An illustrative technology reduces an amount of ranking data analyzed at query time. In the technology, a term is selected, at index time, from a master index. The term corresponds to a number of documents greater than a threshold. A set of documents that includes the term is selected based on the master index. A rank is determined for each document in the set of documents that contains the term. Each document in the set of documents that contains the term is assigned to a top document list or a bottom document list based on the rank. Predefined values of at least part of the rank are stored in the top document list for documents in the top document list and are not stored in the bottom document list for documents in the bottom document list.

20 Claims, 7 Drawing Sheets

U.S. PATENT DOCUMENTS

| | | | |
|---|---|---|---|
| 7,467,132 B2 | 12/2008 | Nakayama et al. | |
| 7,487,141 B1 | 2/2009 | Stephan | |
| 7,548,917 B2 * | 6/2009 | Nelson | 1/1 |
| 7,567,959 B2 | 7/2009 | Patterson | |
| 7,689,617 B2 | 3/2010 | Parikh | |
| 7,693,813 B1 | 4/2010 | Cao et al. | |
| 7,831,587 B2 | 11/2010 | Dymetman | |
| 8,046,370 B2 * | 10/2011 | Wen et al. | 707/748 |
| 2004/0267722 A1 * | 12/2004 | Larimore et al. | 707/3 |
| 2005/0060290 A1 * | 3/2005 | Herscovici et al. | 707/3 |
| 2005/0222977 A1 | 10/2005 | Zhou et al. | |
| 2006/0106792 A1 | 5/2006 | Patterson | |
| 2006/0129538 A1 | 6/2006 | Baader et al. | |
| 2006/0195406 A1 | 8/2006 | Burges et al. | |
| 2006/0195440 A1 | 8/2006 | Burges et al. | |
| 2006/0212443 A1 | 9/2006 | Oyarce | |
| 2007/0150473 A1 | 6/2007 | Li et al. | |
| 2007/0203891 A1 | 8/2007 | Solaro et al. | |
| 2007/0271268 A1 | 11/2007 | Fontoura et al. | |
| 2008/0016050 A1 * | 1/2008 | Stensmo | 707/4 |
| 2008/0195595 A1 | 8/2008 | Masuyama et al. | |
| 2008/0195601 A1 | 8/2008 | Ntoulas et al. | |
| 2008/0313178 A1 | 12/2008 | Bates | |
| 2009/0006360 A1 | 1/2009 | Liao et al. | |
| 2009/0089256 A1 | 4/2009 | Transier et al. | |
| 2009/0112843 A1 | 4/2009 | Hsu et al. | |
| 2009/0193011 A1 | 7/2009 | Blair-Goldensohn et al. | |
| 2009/0198672 A1 | 8/2009 | Jones et al. | |
| 2009/0216750 A1 * | 8/2009 | Sandoval et al. | 707/5 |
| 2009/0248666 A1 | 10/2009 | Ahluwalia | |
| 2010/0063878 A1 | 3/2010 | Bachet et al. | |
| 2011/0004588 A1 * | 1/2011 | Leitersdorf et al. | 707/711 |

OTHER PUBLICATIONS

Zhao et al. "Adapting Document Ranking to Users' Preferences Using Click-through Data", downloaded Apr. 29, 2008.

U.S. Office Action dated Oct. 29, 2010 in U.S. Appl. No. 12/147,666.

U.S. Official Action dated Apr. 5, 2011 in U.S. Appl. No. 12/147,666.

Long, et al., "Optimized Query Execution in Large Search Engines with Global Page Ordering", Retrieved at <<http://cis.poly.edu/suel/papers/order.pdf>> In the proceedings of the 29th VLDB Conference, 2003, pp. 12.

Berchtold, et al., "Fast Nearest Neighbor Search in High-Dimensional Space", Retrieved at <<http://www.cs.ust.hk/~-leichen/courses/comp630j/readings/searchhighdim/fastnn-icde98.pdf>> In the proceedings of 14th International Conference on Data Engineering, Feb. 23-27, 1998, pp. 10.

U.S. Notice of Allowance / Allowability dated Dec. 12, 2011 in U.S. Appl. No. 12/147,666.

* cited by examiner

INDEX OPTIMIZATION FOR RANKING USING A LINEAR MODEL

CROSS-REFERENCE TO RELATED APPLICATIONS

This application is a continuation-in-part of co-pending U.S. patent application Ser. No. 12/147,666, filed on Jun. 27, 2008, entitled "INDEX OPTIMIZATION FOR RANKING USING A LINEAR MODEL," the entire disclosure of which is hereby incorporated by reference.

BACKGROUND

Search engines are a commonly used tool for identifying relevant documents from indexed document collections stored locally on disk or remotely over a private or public network, such as an enterprise network or the Internet, respectively. In a document search, a user typically enters a query into a search engine. The search engine evaluates the query against the document collection and returns a set of candidate documents (i.e., a filtered set) that matches the query. If the query is made through a web browser, for example, then the filtered set may be presented as a list of uniform resource locators ("URLs").

A typical query includes one or more keywords. The search engine may search for the keywords in numerous sources, including the body of documents, the metadata of documents, and additional metadata that may be contained in data stores (e.g., anchor text). Depending on the implementation, the search engine may search for documents that contain all of the keywords in the query (i.e., a conjunctive query) or for documents that contain one of more of the keywords in the query (i.e., a disjunctive query). In order to process the queries efficiently, the search engine may utilize an inverted index data structure that maps keywords to the corresponding documents. The inverted index data structure enables a search engine to easily determine which documents contain one or more keywords.

For large collections of documents, the cardinality of the candidate documents can be very large (potentially in the millions), depending on the commonality of the keywords in the query. It would be frustrating for users if they were responsible for parsing through this many results. In order to reduce the number of search results and to provide more relevant search results, many search engines rank the candidate documents according to relevance, which is typically a numerical score. In this way, the search engine may sort results according to ranking and return only the most relevant search results to the user. The relevance may be based upon one or more factors, such as the number of times a keyword appears in a document and the location of the keyword within the document.

While numerous methodologies exist for ranking candidate documents, these methodologies typically rank the entire filtered set. When the filtered set is sufficiently large (e.g., when the collection of documents is large and the query includes common words), ranking the entire filtered set can be resource intensive and create performance problems. In particular, not only can the ranking operation be computationally expensive, but reading the necessary data from disk to rank the candidate documents can be time consuming. By reducing the number of candidate documents in the filtered set, the ranking operation can be more efficiently performed and the amount of data read from disk can be significantly reduced. However, randomly removing candidate documents from the filtered set may eliminate potentially relevant search results.

It is with respect to these considerations and others that the disclosure made herein is presented.

SUMMARY

Technologies are described herein for providing a more efficient approach to ranking search results. In particular, an index optimization for ranking search results is described herein that includes pre-processing operations at index time as well as real-time or near real-time operations at query time that utilize data generated during the pre-processing operations. The index optimization decreases the time utilized to process expensive queries directed at large filtered sets.

According to one aspect presented herein, technologies are provided for reducing an amount of ranking data analyzed at query time. At index time, the technologies select a term from a master index, such as an inverted index mapping a collection of terms to the documents containing the terms. The selected term is contained in a number of documents greater than a threshold. The threshold indicates whether the selected term is considered common for purposes of index optimization.

Upon selecting the term, the technologies select, from the master index, a set of documents containing the term and determine a rank, such as a linear rank, for each document in the set. The technologies then map each document in the set to the selected term in a top document list or a bottom document list based on the rank. For example, documents with a higher rank may be included in the top document list, while documents with a lower rank may be included in the bottom document list. Each selected term may be associated with a different top document list and bottom document list pair. The technologies may store predefined values of at least part of the linear rank, such as a static rank, a BM25 value, and/or a term rank, in the top document list, while the technologies may not store the predefined values of the term rank in the bottom document list. The bottom document list may be represented by a bitmap and a document identifier mask.

At query time, the technologies receive a query. The technologies generate a document result set and populate it with a subset of documents that match the query. In particular, technologies may determine whether one or more of the query terms contained in the query satisfy one of two conditions. In the first condition, if all query terms contained in the query are common terms, then the document result set is populated with documents that occur either in the top document list or the bottom document list 118. According to some embodiments, each document is present in the top document 116 for at least one of the query terms. In the second condition, if at least one of the query terms contained in the query is an uncommon term, then the document result set is populated with the documents from the master index that satisfy the query.

Upon generating and populating the document result set, the technologies retrieve the predefined values of the term rank from the top document list. The technologies then score and rank the document result set according to a linear model based on the retrieved values of the term rank. Upon scoring and ranking the document result set, the technologies select a reduced subset with the highest linear rank from the document result set and forward the reduced subset to a more computationally intensive ranking function, such as a two-layer neural network.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a more efficient approach to ranking search results. In particular, an index optimization for ranking search results is described herein that decreases the time utilized to process expensive queries directed at large filtered sets.

The index optimization includes at least two stages: (1) an index time pre-calculation of ranking data; and (2) a query time ranking based on the pre-calculated data. At index time, for each common term in an inverted index, a simple rank, such as a linear rank, is calculated for each document corresponding to the term. Documents having a higher linear rank value may be assigned to a top document list. The remaining documents may be assigned to a bottom document list. The top document list may also store the linear rank values, such as a static rank, a BM25F value, and/or a term rank, for each document in the top document list. However, in some embodiments described herein, the bottom document list may store no linear rank values in order to conserve space. At query time, a document result set may be identified that satisfies the query. This document result set may be ranked based on a linear model based on the linear rank values retrieved from the top document list. A reduced subset with the highest linear rank from the document result set may be selected and re-ranked according to one or more computationally expensive ranking functions (e.g., neural networks) and provided to a user in response to the query.

Embodiments described herein are generally directed to search systems. Search systems may implement various search techniques to search, retrieve, score, rank, display, and perform other search operations designed to provide relevant search results in response to a search query. The search results may include, for example, a list of resources derived from various information sources. In some cases, the information sources may reside on a single device, such as resources in a file system for a personal computer. In other cases, the information sources may reside on multiple devices, such as resources on network servers accessible via a communications network. In both cases, a search application may receive a search query having multiple search terms, search for resources, such as documents or web pages that have some or all of the search terms, and return a list of resources or resource identifiers (e.g., a URL) matching the search query.

The index optimization described herein is primarily designed for responding to queries in which the filtered set contains a relatively large number of candidate documents. When the filtered set is small, search systems can quickly return results such that an optimization provides little or no additional benefit. The filtered set may be large because a large collection of documents is searched and a query includes terms common in many of those documents. The index optimization presented herein shifts some of the data analysis that can be performed at query time to index time. This approach is particularly useful in situations where the query time calculations are computationally expensive and/or time-consuming. Although not so limited, the embodiments described herein refer primarily to an implementation where the terms within a query are conjunctive. Thus, a search engine will find documents that include every term in a query.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
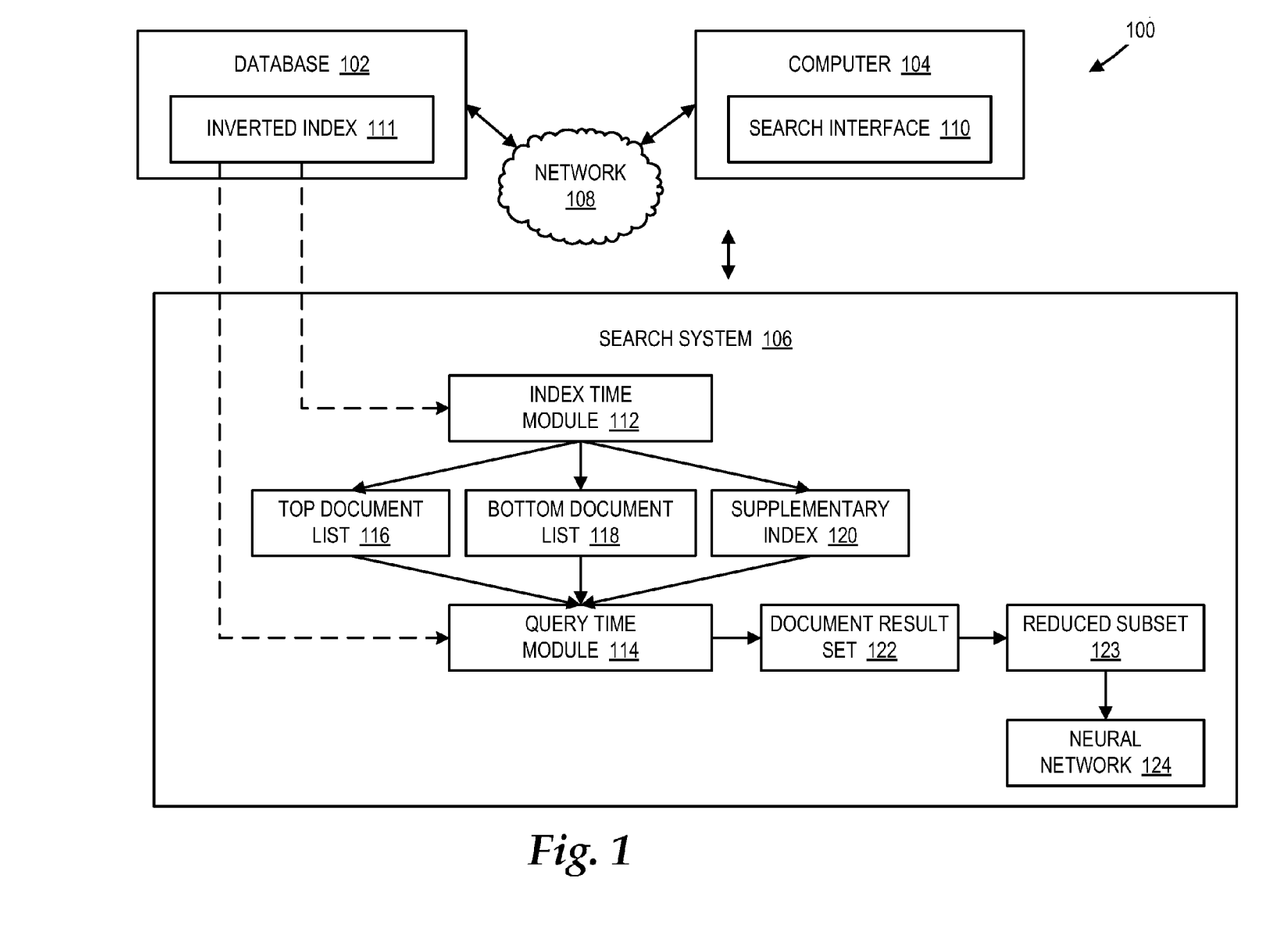
FIG. 1 is a network architecture diagram showing a search system adapted to implement an index optimization, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, aspects of a computing system and methodology for ranking search results based on an index optimization technique will be described. FIG. 1 shows an illustrative network architecture 100 configured to implement an embodiment of the index optimization feature described herein. In particular, the network architecture 100 includes a database 102, a computer 104, and a search system 106, each of which is coupled to a network 108. In other embodiments, the database 102, the computer 104, and/or the search system 106 may be locally coupled.

The computer 104 includes a search interface 110 in which a user utilizing the computer 104 can input a query, submit the query to the search system 106, and display the search results returned from the search system 106. In one embodiment, the search interface 110 is provided through a web browser configured to access a search engine via a private or public computer network, such as the network 108. In another embodiment, the search interface 110 is provided by a standalone computer application executed on the computer 104.

The search system 106 receives the query, retrieves search results from the database 102 to satisfy the query, and transmits the search results to the computer 104. In one embodiment, the database 102 includes an inverted index 111, which maps query terms (e.g., words, numbers, strings, etc.) to the documents that include the query terms. Although not so illustrated in FIG. 1, the database 102 may further store documents and associated document information, such as document properties or metadata, related to the documents.

The inverted index 111 provides the search system 106 with information that is useful for performing an efficient search without the need to parse through entire documents. By utilizing the inverted index 111, the search system 106 can efficiently identify documents that contain every term in a query. For example, in a query that includes two terms, a first term may map to a first set of documents {A, B, C}, and the second term may map to a second set of documents {B, C, D} according to the inverted index 111. A merge operation on the first set of documents and the second set of documents reveals that the two terms in the query map to the documents {B, C}. It should be appreciated that the inverted index 111 may also be stored locally on the search system 106 or on another suitable computer system. The inverted index 111 may also be referred to herein as a master index.

As illustrated in FIG. 1, an embodiment of the search system 106 includes an index time module 112 and a query time module 114. The index time module 112, which operates at index time, calculates a linear rank for each document including a given term in the inverted index 111. According to embodiments, the linear rank is calculated for only common terms, which are defined herein as terms that are found in a sufficiently large number of documents in the inverted index 111 (e.g., in at least 50,000 documents in an index containing 20 million documents). A linear rank may be computed for each of the documents with respect to each common term. That is, the linear rank may be computed separately for each term as if a single-term query contains only the common term.

The search system 106 further includes a top document list 116 and a bottom document list 118. The top document list 116 and the bottom document list 118 may correspond to a given common term. It should be appreciated that each common term may be associated with a different top document list and bottom document list pair. The top document list 116 includes one or more documents that contain the common term and have a linear rank above a threshold. In contrast, the bottom document list 118 includes one or more documents that contain the common term and have a linear rank below the threshold. In some embodiments, the top document list 116 and the bottom document list 118 may also store at least part of the linear rank, such as a static rank, a BM25F value, and/or a term rank, for each term-document pair in the included documents. This portion of the linear rank that is stored in the top document list 116 and/or the bottom document list 118 may also be referred to herein as pre-computed values. In one embodiment, a supplementary index 120 is also provided that includes a static rank for each of the corresponding documents.

In some other embodiments, the top document list 116 may store the pre-computed values, such as a static rank, a BM25F value, and/or a term rank, for each term-document pair, and the bottom document list 118 may not store the pre-computed values for each term-document pair. When the bottom document list 118 does not store the pre-computed values for each term-document pair, the size of the bottom document list 118 can be significantly reduced. As a result, processor reads from the bottom document list 118 may become faster because the processor no longer needs to read the pre-computed values. Further, by reducing the size of the bottom document list 118, the bottom document list 118 can be configured and stored in a format that utilizes less compression. Thus, processor load can be further reduced by eliminating the need to uncompress data. An example format of the bottom document list 118 is described in greater detail below with reference to FIG. 4.

The query time module 114, which operates at query time, receives a query containing one or more terms from the computer 104. For each term in the query, the query time module 114 determines whether the term is a common term. As previously discussed, a top document list and a bottom document list, such as the top document list 116 and the bottom document list 118, are generated for each of the common terms. A document result set 122 is then populated with a subset of documents that match the query and have at least one term that satisfies a condition. In one embodiment, the condition may be either that the term is not common or that the document including the term is from the top document list 116. Data contained in the top document list 118 may be used to calculate linear rank at query time for documents that are contained in the document result set 122.

In one embodiment, linear rank may be used to limit the number of documents in the document result set 122 to a reduced subset 123 (e.g., about 2000 documents in an index containing 20 million documents) having the highest linear rank from the document result set 122. The query time module 114 then forwards the reduced subset 123 to a neural network 124, which re-ranks the document result set 122 according a two-layer neural network model or other suitable ranking function.

As used herein, the term index time refers to a time before a query is received from a user through the computer 104. For example, operations performed by the index time module 112 may be referred to as pre-calculations because these operations reduce the amount of data that is analyzed at query time when a query is actually requested. The term query time refers to a time after a query is received from a user and when the query is being processed. The length of the query time may depend, at least in part, on the ability for the search system 106 to timely and efficiently respond to the query. As such, by reducing the disk reading and computation time utilized by the query time module 114 and the neural network 124 to satisfy the query, the query time as a whole can be reduced.

Figure 2:
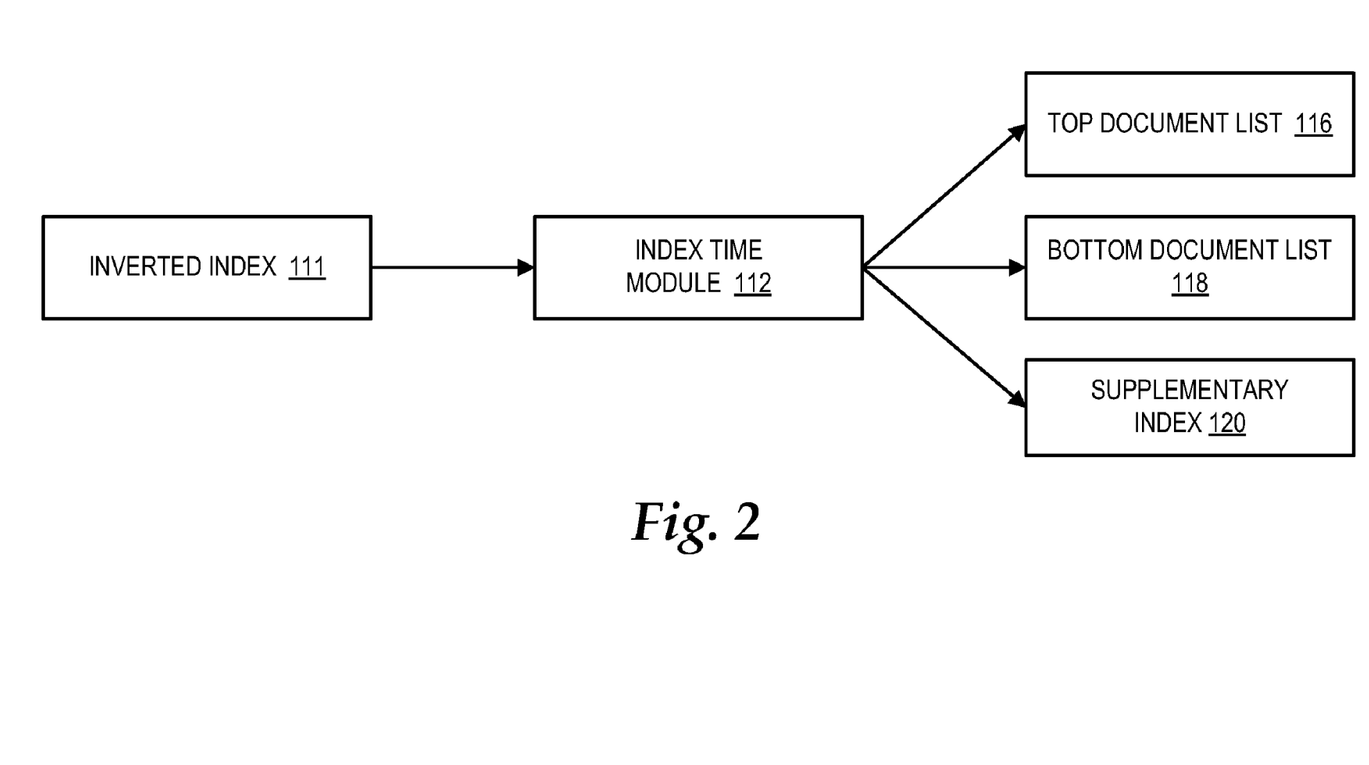
FIG. 2 is a block diagram showing the operation of the index time module, in accordance with some embodiments.

Referring now to FIG. 2, additional details will be provided regarding an illustrative implementation of the index time module 112. As illustrated in FIG. 2, the index time module 112 receives or accesses the inverted index 111 and generates a top document list 116, a bottom document list 118, and a supplementary index 120 based on data stored in the inverted index 111. As previously described, the top document list 116 and the bottom document list 118 are available for only common terms (i.e., terms found in a sufficiently large number of documents relative to the size of the inverted index 111). Further, as previously described, the supplementary index 120 includes a static rank for each document. Other terms that are not considered common terms are not considered in this optimization. For example, non-common terms may utilize a complete document list (not shown) that does not partition between top and bottom document lists.

An illustrative equation for determining the linear rank, which is denoted below as linear_rank, is shown below in equation (1).

$$\text{linear\_rank} = w_{BM25} * \sum \text{term\_rank} \times \log\left(\frac{N}{n}\right) + \text{static\_rank} \quad (1)$$

The variable $w_{BM25}$ refers a weight accorded to the BM25F ranking function, which is denoted in the equation (1) as the follow expression.

$$\sum \text{term\_rank} \times \log\left(\frac{N}{n}\right)$$

The BM25F ranking function is an equation that ranks a document according to multiple document characteristics (e.g., term frequency, document length, etc.). The result of the BM25F ranking function is a single value that can be easily compared with other values to determine a relative relevance for each document with respect to query terms.

In equation (1), the variable N refers to the total number of documents in the search domain, and the variable n refers to a subset of the N documents containing the given term (i.e., document frequency). The static rank, which is denoted as static_rank in equation (1), is a value denoting any properties of the documents that are not dependent on the query. These properties may also be referred to herein as query-independent properties. For example, the static rank may be higher for a presentation document than for a spreadsheet document, thereby indicating that the presence of the given term in the presentation document is generally more relevant than the presence of the given term in the spreadsheet document.

The term rank, which is denoted in equation (1) as term_rank, refers to an individual ranking for each term within a given document. An illustrative equation for determining the term rank is shown below in equation (2).

$$\text{term\_rank} = \frac{tf'_t(k_1 + 1)}{k_1 + tf'_t} \quad (2)$$

The variable $tf'_t$ refers to term frequency determination where the variable t is an individual query term. The variable $k_1$ refers to the curvature. An illustrative equation for determining $tf'_t$ is shown below in equation (3).

$$tf'_t = \sum_{p \in D} tf_{tp} \cdot w_p \cdot \frac{1}{(1-b) + b\left(\frac{DL_p}{AVDL_p}\right)} \quad (3)$$

The variable p is an individual property of the given document denoted by D. The variable $tf_{tp}$ refers to a term frequency of term t in the property p. The variable $w_p$ refers to the weight for the property p. The variable b refers to the length normalization of the property p. The variable $DL_p$ refers to a length of the property p. The variable $AVDL_p$ refers to the average length of the property p in the entire collection.

As used herein, the property p refers to fields associated with the document in which the individual search terms may be found. In one embodiment, the fields include body, title, author, anchor text, URL display name, and extracted title. It should be noted that some of the fields (e.g., body) are part of the document itself, while others may be metadata directly associated with the document. Still others (e.g., anchor text specified for a hyperlink to the document) may be metadata which is indirectly associated with the document, but is stored with a different document.

Upon computing the linear rank for each document containing a common term, the index time module 112 compares each linear rank to a threshold that indicates whether the document is assigned to the top document list 116 or the bottom document list 118. In particular, documents with a linear rank above the threshold are included in the top document list 116, and documents with a linear rank below the threshold are included in the bottom document list 118. The top document lists and the bottom document lists, such as the top document list 116 and the bottom document list 118, map the documents to the respective common term. For example, the top document list 116 and the bottom document list 118 may correspond to a given common term. In some embodiments, the top document list 116 may further include pre-computed values, such as a static rank, a BM25F value, and/or term rank, associated with each document for the given common term. In this case, the bottom document list 118 may not store such pre-computed values for the documents in the bottom document list 118. During the linear rank computation at query time, the pre-computed values can be read from the top document list 116 for common terms if common terms are present in the query. In one embodiment, the threshold is separately selected for each term in such a way that a predefined number of documents are included in the top document list 116.

Figure 3:
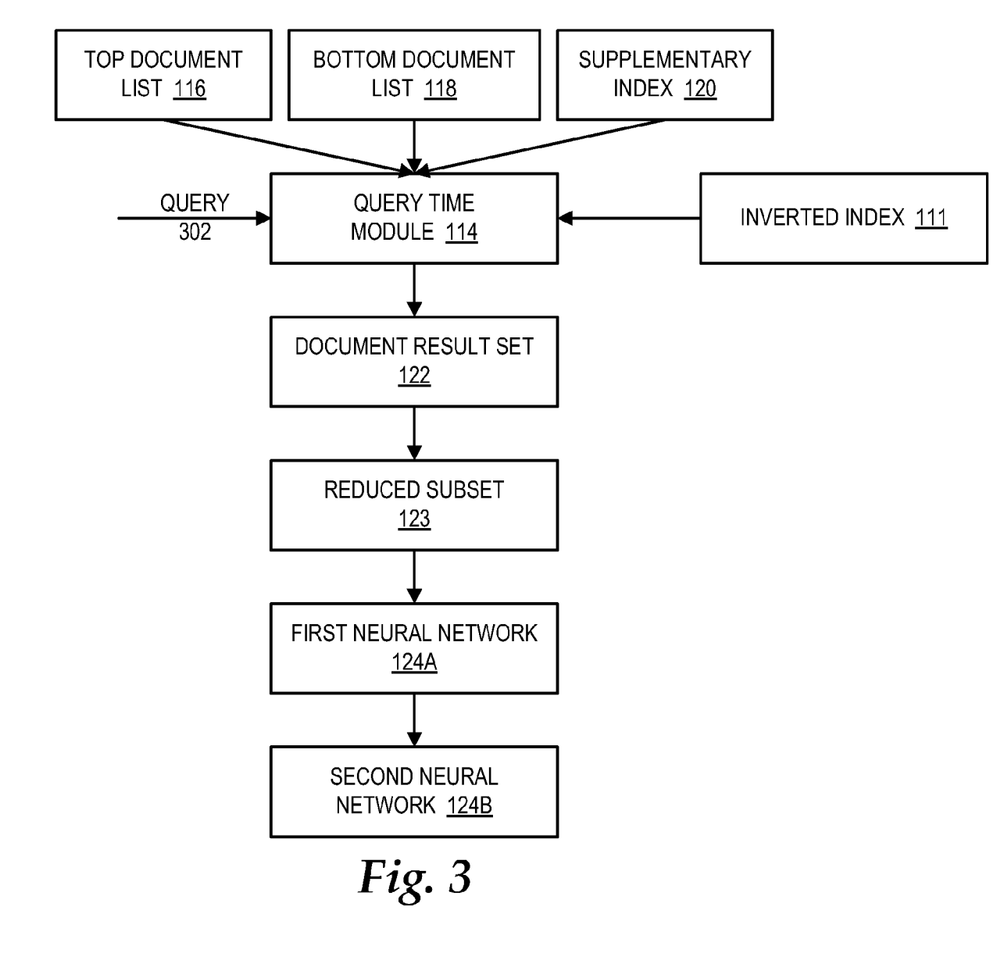
FIG. 3 is a block diagram showing the operation of the query time module and the re-ranking module, in accordance with some embodiments.

Referring now to FIG. 3, additional details will be provided regarding an illustrative implementation of the query time module 114. As illustrated in FIG. 3, the query time module 114 receives a query 302 from the computer 104. The query 302 may include one or more query terms for which documents containing all of the query terms are requested. Upon receiving the query 302, the query time module 114 determines whether one or more of the query terms contained in the query 302 satisfy one of two conditions as described below.

In a first condition, if all query terms contained in the query 302 are common terms, then the document result set 122 is populated with documents that occur in either the top document list 116 or the bottom document list 118 for all query terms. In some embodiments, for each document, at least one of the query terms is contained in the top document list 116. In this case, the bottom document 118 essentially assures that each document contains every term in the query. In one embodiment, each document in the document result set 122 contains every query term. If query term is common, the top document list 116 and the bottom document list 118 are looked up to verify this.

In a second condition, if at least one of the query terms contained in the query 302 is an uncommon term (i.e., does not have the top document list 116 and the bottom document list 118), then the document result set 122 is populated with the documents from the inverted index 111 that satisfy the query 302. In one embodiment, the document result set 122 is populated with all of the documents in the inverted index 111 that satisfy the query 302. In the instances in which the terms in the query 302 do not meet either of the two conditions, the index optimization may be skipped.

In one embodiment, the size of the document result set 122 is proportional to the total number of documents that match the query 302. Thus, when the total number of documents that match the query is larger, the size of document result set 122 is larger. Likewise, when the total number of documents that match the query 302 is smaller, the size of document result set 122 is smaller. This approach increases ranking accuracy. However, for performance reasons, the ratio of documents in document result set 122 to the total number of documents that match the query 302 may decrease as the total number of documents that match the query 302 increases.

Upon populating the document result set 122, the query time module 114 scores and ranks the document result set 122 according to the linear rank based on the pre-computed term rank scores from the top document list 116. As previously described, the bottom document list 118 does not contain the pre-computed term rank scores. As a result, query time module 114 may assume a zero value of the term rank for documents in the bottom document list 118.

Upon scoring and ranking the document result set 122, the query time module 114 forwards a reduced subset 123 (e.g.

the top 2000 documents) of the document result set 122 to the neural network 124. The neural network 124 may perform a computationally expensive ranking function on the reduced subset 123. When the query 302 includes at least one term in the top document list 116, the size of the document result set 122 provides a significant reduction in size over all of the documents in the inverted index 111 that satisfy the query 302. Further, the size of the document result set 122 may also be reduced by a strong upper limit in which document with only the highest linear rank may be included. Conventionally, every document may be ranked although only a subset of the top ranked documents may be utilized. The optimization described herein may reduce this time-consuming operation to an efficient operation whereby only documents that have at least one term in the top document list 118 are ranked.

As illustrated in FIG. 3, the neural network 124 includes a first neural network 124A and a second neural network 124B for re-ranking the document result set 122. The first neural network 124A performs a first re-ranking of the reduced subset 123 using a first neural network model with a reduced feature set. Upon performing the first re-ranking of the reduced subset 123, the first neural network 124A forwards the reduced subset 123 to the second neural network 124B, which performs a second re-ranking of the reduced subset 123 using a second neural network model with a full feature set. For example, the second neural network model may re-rank the reduced subset 123 using more features that are even more time-consuming than the computation performed by the first neural network model. However, the second neural network 124B may reduce computational time by re-ranking only a top subset of documents from the reduced subset 123 upon receiving the reduced subset 123 from the first neural network 124A.

It should be appreciated that the neural network models described herein are merely exemplary, and other ranking methodologies may be utilized to rank the reduced subset 123, as contemplated by those skilled in the art. Further any number of ranking operations may be performed. One reason for performing a first re-ranking and second re-ranking is for performance optimization. In particular, re-ranking based on a full feature set, such as a proximity ranking, can be computationally expensive and time consuming.

The query time module 114 can save a significant amount of time by utilizing the pre-computed values for at least part of the linear rank that is stored on the top document list 116 and/or the bottom document list 118. These pre-computed values may include the static rank, the BM25F value, and/or the term rank. As previously described, in some embodiments, the top document list 116 and the bottom document list 118 may store the pre-computed values. In some other embodiments, the top document list 116 may store the pre-computed values, but the bottom document list 118 may not store the pre-computed values. For example, documents that occur only in the bottom document list 118 for all terms may not be ranked at all. A majority of documents that match the query 302 may fall into this category if the query 302 contains common terms.

When the top document list 116 and the bottom document list 118 store the pre-computed values, the query time module 114 can read the pre-computed values as necessary from the top document list 116 and the bottom document list 118. The query time module 114 can then determine the linear rank utilizing the pre-computed values. When the top document list 116 stores the pre-computed values and the bottom document list 118 does not store the pre-computed values, the query time module 114 can read the pre-computed values as necessary from the top document list 116. However, instead of the pre-computed values from the bottom document list 118, the query time module 114 may assume that the corresponding pre-computed values have a zero value. Due to the way documents are split between the top document list 116 and the bottom document list 118, the error for assuming that the pre-computed values have a zero value is relatively small and acceptable in practical application.

Figure 4:
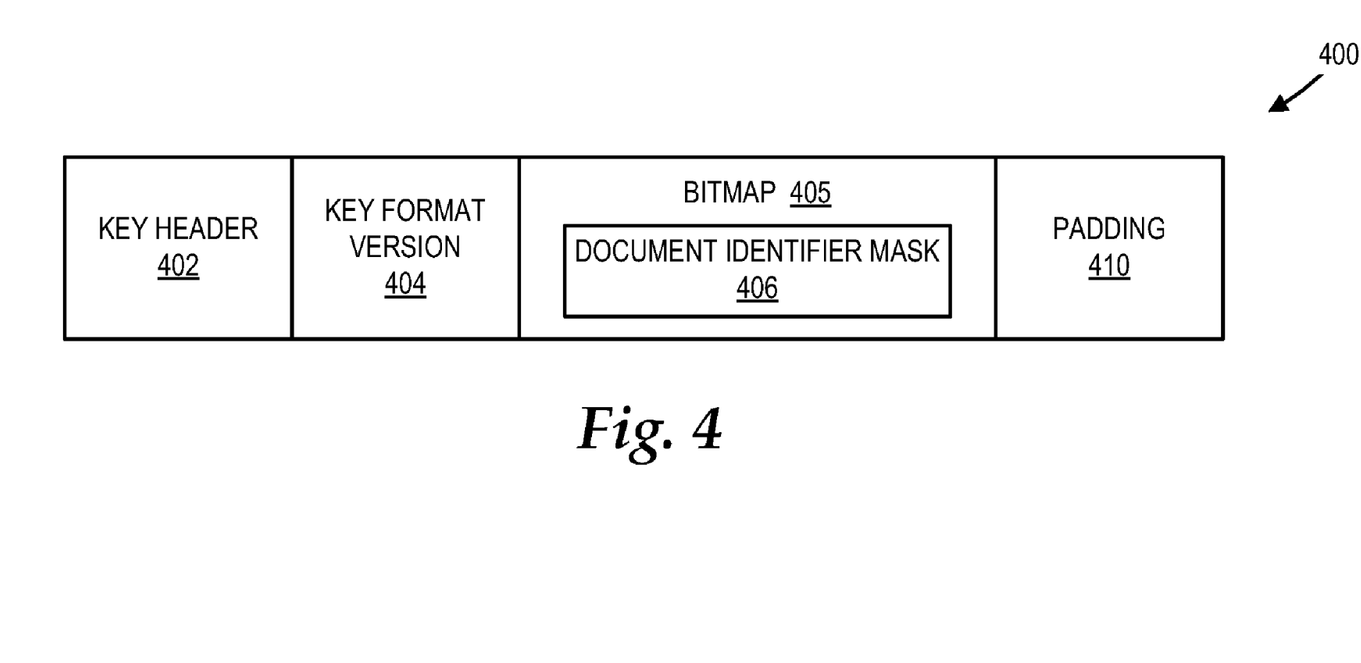
FIG. 4 is a diagram showing an illustrative implementation of a bottom document list, in accordance with some embodiments.

Referring now to FIG. 4, details will be provided regarding an illustrative implementation of the bottom document list 118. A key refers to a list of documents associated with a term. For example, keys may be included in the inverted index 111, the top document list 116, and the bottom document list 118 in order to map each term to a list of documents. Each document is typically referred to by a document identifier. The documents may be sorted sequentially by the document identifier. In some embodiments, the keys may be compressed utilizing delta compression (i.e., store difference between previous document identifier and the next document identifier, instead of storing the next document identifier in its entirety) or other suitable compression.

As previously described, in some other embodiments, the top document list 116 may store the pre-computed values, but the bottom document list 118 may not store the pre-computed values. In this case, each key in the bottom document list 118 may be represented as a bitmap. In particular, the bitmap may include a continuous set of bits equal to a maximum number of document identifiers. For example, if the maximum number of document identifiers is a value represented by the variable MaxDocID, then the bitmap may be numbered from zero to MaxDocID−1. Each bit may be associated with a particular document identifier. A first bit value (e.g., a zero bit) may indicate that the corresponding document does not include the corresponding term, and a second bit value (e.g., a one bit) may indicate that the corresponding document includes the corresponding term.

In some embodiments, an additional optimization to the bitmap can be applied in cases where only a portion of the possible document identifiers are known to be present in a particular index. In particular, document identifiers may be distributed between two or more machines. For example, a set of document identifiers may include a first portion of document identifiers and a second portion of document identifiers. The first portion may be stored on a first search system, and the second portion may be stored on a second search system. Because the document identifiers from the second portion will not be present in the first search system, the size a bitmap in the first search system can be reduced such that the bitmap does not store bits corresponding to the second portion. Similarly, because the document identifiers from the first portion will not be present in the second search system, the size of a bitmap in the second search system can be reduced such that the bitmap does not store any bits corresponding to the first portion.

As illustrated in FIG. 4, an illustrative key data structure 400 includes a key header 402, a key format version 404, a bitmap 405, a document identifier mask 406, and padding bits 410. When searching methodologies evaluate a key having the key data structure 400, the searching methodologies may initially evaluate the key header 402. For example, the key header 402 may contain information or a pointer to information utilized to evaluate the key. The key format version 404 may indicate the version of the key data structure 400. For example, different versions of the key data structure 400 may contain different types of information. By reading the key format version 404, searching methodologies can identify the layout of information in the key. In one embodiment, the default value for the key format version 404 is zero. The padding bits 410 may be included as necessary to align the key data structure 400 to a boundary (e.g., a four-byte boundary).

In one embodiment, the bitmap 405 contains the document identifier mask 406 having 256 bits, each bit corresponding to a different set of documents. If a bit at position i is set in the document identifier mask 406, then a document with a document identifier, DocId, having the last eight bits equal to i may be present in document list. The bitmap 405 may contain just enough bits to identify documents having a DocId less than a maximum document identifier, MaxDocID. In some embodiments, if a bit at position k is set in the bitmap 405, then the DocId for a corresponding document may be defined by the following equation: DocId=(k/NumMask)*MaskSize+MaskPos[k % NumMask]. In this equation, NumMask refers to the number of set bits in the document identifier mask 406, MaskSize refers to the total number of bits in document identifier mask 406 (e.g., 256), and MaskPos[a] is the position of a's set bit in the document identifier mask 406. For example, if the document identifier mask 406 has eight bits "00110101," then MaskPos[0]=2 (i.e., the first set bit is at position two), MaskPos[1]=3 (i.e., the second set bit is at position three), MaskPos[2]=5 (i.e., the third set bit is at position five), and MaskPos[3]=7 (i.e., the fourth set bit is at position seven). Further, in this equation, the division operation represented by "/" may be integer division, and the percent character "%" may represent a modulo operation which returns a remainder of integer division.

In an illustrative example, the document identifier mask 406 may contain eight bits "00110101," indicating that four bits are set. The document identifier mask 406 may specify a range of documents in a list. In this case, NumMask=4 and The corresponding bitmap 405 has nine bits "110100011" that encode documents with DocId={2, 3, 7, 15, 18}. The bitmap 405 may specify which documents from the range contain a given term. In particular, in the bitmap 405, bits at positions k=0, 1, 3, 7, and 8 are set. When k=0, then the DocId=(0/4)*8+MaskPos[0% 4]=0*8+MaskPos[0]=0+2=2. When k=1, then the DocId=(1/4)*8+MaskPos[1% 4]=0*8+MaskPos[1]=0+3=3. When k=3, then the DocId=(3/4)*8+MaskPos[3% 4]=0*8+MaskPos[3]=0+7=7. When k=7, then the DocId=(7/4)*8+MaskPos[7% 4]=1*8+MaskPos[3]=8+7=15. When k=8, then the DocId=(8/4)*8+MaskPos[8% 4]=2*8+MaskPos[0]=16+2=18.

Figure 5A:
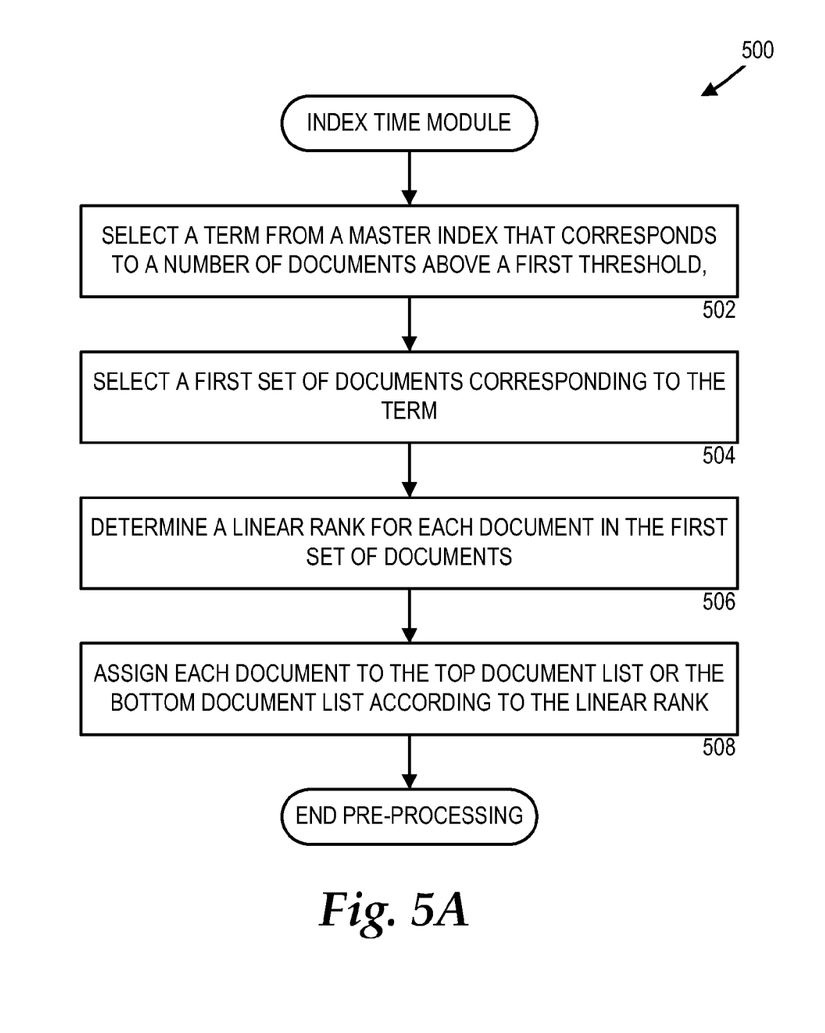
FIG. 5A is a flow diagram showing an illustrative implementation of an index time module, in accordance with some embodiments.
Figure 5B:
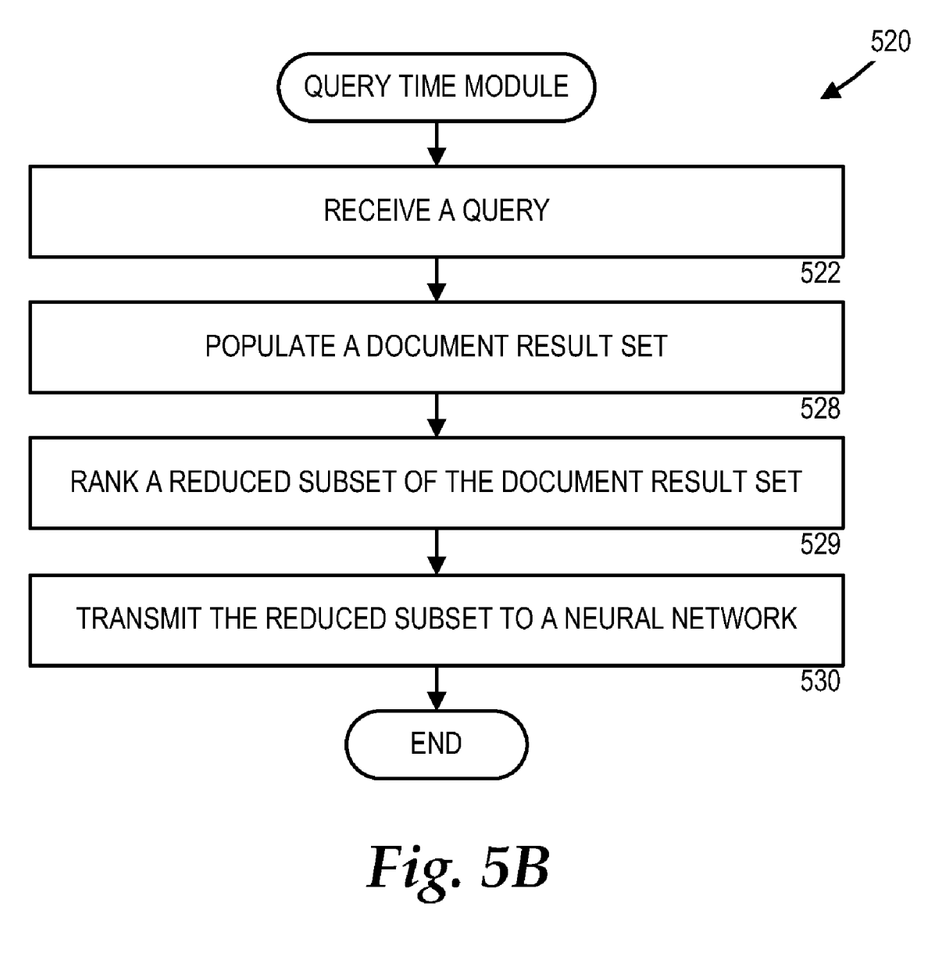
FIG. 5B is a flow diagram showing an illustrative implementation of a query time module, in accordance with some embodiments.

Turning now to FIGS. 5A and 5B, additional details will be provided regarding the operation of the search system 106. In particular, FIG. 5A is a flow diagram illustrating aspects of one method provided herein for performing index time pre-processing of documents from the inverted index 111. FIG. 5B is a flow diagram illustrating aspects of one method provided herein for performing query time processing of a query, such as the query 302, based in accordance with the index time pre-processing of FIG. 5A. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 5A, a routine 500 may be performed by the index time module 112, which operates at index time (i.e., in pre-processing prior to queries being processed). The routine 500 begins at operation 502, where the index time module 112 selects a term from the inverted index 111 (i.e., the master index) that corresponds to a number of documents above a first threshold. In this case, the first threshold may specify a minimum number of documents that are associated with a term in order for the index optimization to be beneficial. When a term is associated with a sufficiently large number of documents, then executing a computationally expensive ranking function, such as a neural network, on every document can be a resource intensive and time-consuming task. As such, these terms, referred to herein as common terms, are selected as candidates for index optimization. Upon selecting the appropriate terms from the inverted index 111, the routine 500 proceeds to operation 504.

At operation 504, the index time module 112 selects a first set of documents corresponding to the selected term. The index time module 112 may access the inverted index 111, which maps the term to corresponding documents that contain the term. In this way, the index time module 112 can easily find which documents are associated with the selected term. The routine 500 then proceeds to operation 506, where the index time module 112 determines a linear rank for each document in the first set of the documents. The linear rank may be based on the term rank (e.g., a BM25F ranking value) for the selected term with respect to the given document as well as the static rank for the given document. Upon determining the linear rank of each document associated with the selected terms, the routine 500 proceeds to operation 508.

At operation 508, the index time module 112 assigns each document in the first set of documents to the top document list 116 or the bottom document list 118. In particular, the index time module 112 may assign a document from the first set of documents to the top document list 116 if the linear rank of the document for a given term is above a second threshold. Similarly, the index time module 112 may assign a document in the first set of documents to the bottom document list 118 if the linear rank of the document for a given term is below the second threshold. In some embodiments, the top document list 116 and the bottom document list 118 further store pre-computed values, such as the BM25F value or the term rank, for each term-document pair. In some other embodiments, the top document list 116 may store the pre-computed values, such as the BM25F value or term rank, for each term-document pair, and the bottom document list 118 may not store the pre-computed values for each term-document pair.

It should be appreciated that operations 502-508 can be repeated for every term in the inverted index 111 that corresponds to a number of documents greater than a first threshold (i.e., the common terms). Although not so illustrated in FIG. 5A, the index time module 112 may also create the supplementary index 120, which includes the static rank for each common term.

Referring to FIG. 5B, a routine 520 may be performed by the query time module 114, which operates at query time (i.e., as a query is processed). The routine 520 begins at operation 522, where the query time module 114 receives a query, such as the query 302, from a user. For example, the user may enter the query 302 through the search interface 110 in the computer 104. The routine 520 then proceeds to operation 528.

At operation 528, the query time module 114 generates the document result set 122 and populates it with a subset of documents that match the query. In particular, the query time module 114 may determine whether one or more of the query terms contained in the query 302 satisfy one of two conditions as previously. In the first condition, if all query terms contained in the query 302 are common terms, then the document result set 122 is populated with documents that occur either in the top document list 116 or the bottom document list 118. For at least one of the query terms, each document containing the query term is from the top document list 116. In the second condition, if at least one of the query terms contained in the query 302 is an uncommon term (i.e., does not have the top document list 116 and the bottom document list 118), then the document result set 122 is populated with the documents from the inverted index 111 that satisfy the query 302. Upon generating the document result set 122, the routine 520 proceeds to operation 529.

At operation 529, the query time module 114 ranks the document result set 122 according to a linear rank. In particular, the query time module 114 may retrieve predefined values of the term rank or other portions of the linear rank from the top document list 116 and utilize the term rank to compute the linear rank. As previously described, the bottom document list 118 does not contain the pre-computed term rank scores. As a result, query time module 114 may assume a zero value of the term rank for documents in the bottom document list 118. Upon re-ranking the document result set 122, the routine 520 proceeds to operation 530, where the query time module 114 forwards the reduced subset 123 of the document result set 122 to the neural network 124. The results of the neural network 124 may be provided to the user via the search interface 110 or to other suitable processes within the search system 106.

Figure 6:
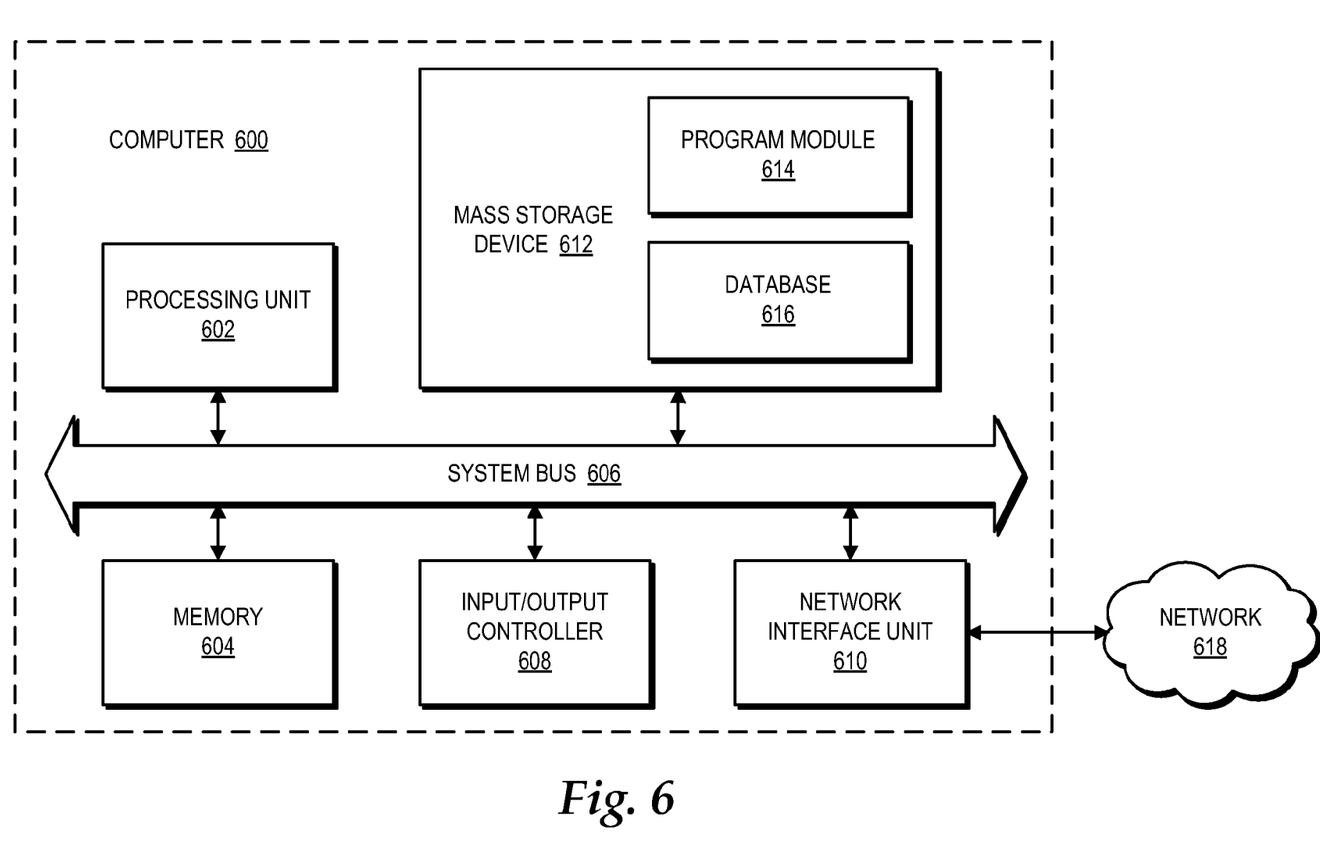
FIG. 6 is a computer architecture diagram showing aspects of an illustrative computer hardware architecture for a computing system capable of implementing aspects of the embodiments presented herein.

Referring now to FIG. 6, an exemplary computer architecture diagram showing aspects of a computer 600 is illustrated. Examples of the computer 600 may include the computer 104 and the search system 106. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program modules 614 may include an index time module 112 and a query time module 114. In one embodiment, the program modules 614 may further include a program module adapted to implement the key data structure 400 of FIG. 4. An example of the databases 616 is the database 102. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 618. An example of the network 618 is the network 108. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

Based on the foregoing, it should be appreciated that technologies for ranking search results are presented herein. In particular, an index optimization is described that incorporates index time pre-processing as well as query time processing based on the pre-processed data. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for reducing an amount of ranking data analyzed at query time, the method comprising computer-implemented operations for:

at index time, selecting a term from a master index, the term corresponding to a number of documents greater than a threshold;

selecting a set of documents that includes the term based on the master index;

determining a rank for each document in the set of documents that contains the term;

assigning each document in the set of documents that contains the term to a top document list for the term or a bottom document list for the term based on the rank;

storing predefined values of at least part of the rank in the top document list for documents in the top document list and not storing the predefined values of at least part of the rank in the bottom document list for documents in the bottom document list;

at query time, determining whether each query term in a query is common;

upon determining that each query term is common, populating a document result set with at least a subset of documents from the top document list and the bottom document list that satisfy the query, each of the subset of documents occurring in the top document list for at least one term in the query;

upon populating the document result set, retrieving the predefined values from the top document list;

ranking the document result set according to a linear model based on the predefined values for documents from the top document list and zero values for documents from the bottom document list; and transmitting a reduced subset of the document result set having the highest linear rank to a ranking function adapted to re-rank the documents in the reduced subset.

2. The computer-implemented method of claim 1, wherein the rank comprises a linear rank.

3. The computer-implemented method of claim 2, wherein the linear rank comprises a function based on a term rank associated with each term in a document and a static rank associated with the document; and wherein the at least part of the rank comprises the term rank.

4. The computer-implemented method of claim 3, wherein the term rank comprises a BM25F ranking value, and wherein the static rank is based upon one or more query-independent properties.

5. The computer-implemented method of claim 1, wherein the ranking function comprises a two-layer neural network.

6. The computer-implemented method of claim 5, wherein the two-layer neural network comprises a first layer based on a reduced feature set and a second layer based on a full feature set.

7. The computer-implemented method of claim 1, further comprising generating a supplementary index comprising a static rank for each of the documents.

8. The computer-implemented method of claim 1, wherein the document result set comprises documents that include every term in the query.

9. The computer-implemented method of claim 1, wherein the reduced subset comprises a highest ranking subset of the document result set, and wherein the rank comprises a simple rank or a linear rank.

10. A computer-readable storage medium having computer-executable instructions stored thereon which, when executed by a computer, cause the computer to:
at index time, select a term from a master index, the term corresponding to a number of documents greater than a threshold;
select a set of documents that includes the term based on the master index;
determine a rank for each document in the set of documents that contains the term;
assign each document in the set of documents that contains the term to a top document list for the term or a bottom document list for the term based on the rank;
store predefined values of at least part of the rank in the top document list for documents in the top document list and not storing the predefined values of at least part of the rank in the bottom document list for documents in the bottom document list;
at query time, determine whether each query term in a query is common;
upon determining that each query term is common, populate a document result set with at least a subset of documents from the top document list and the bottom document list that satisfy the query, each of the subset of documents occurring in the top document list for at least one term in the query;
upon populating the document result set, retrieve the predefined values from the top document list;
rank the document result set according to a linear model based on predefined values for documents from the top document list and zero values for documents from the bottom document list; and
transmit a reduced subset of the document result set having the highest linear rank to a ranking function adapted to re-rank the documents in the reduced subset.

11. The computer-readable storage medium of claim 10, wherein the rank comprises a linear rank.

12. The computer-readable storage medium of claim 11, wherein the linear rank comprises a function based on a term rank associated with each term in a document and a static rank associated with the document; and wherein the at least part of the rank comprises the term rank.

13. The computer-readable storage medium of claim 12, wherein the term rank comprises a BM25F ranking value, and wherein the static rank is based upon one or more query-independent properties.

14. The computer-readable storage medium of claim 10, wherein the ranking function comprises a two-layer neural network.

15. The computer-readable storage medium of claim 14, wherein the two-layer neural network comprises a first layer based on a reduced feature set and a second layer based on a full feature set.

16. The computer-readable storage medium of claim 10, further comprising generating a supplementary index comprising a static rank for each of the documents.

17. The computer-readable storage medium of claim 10, wherein the document result set comprises documents that include every term in the query.

18. The computer-readable storage medium of claim 10, wherein the reduced subset comprises a highest ranking subset of the document result set, and wherein the rank comprises a simple rank or a linear rank.

19. A computer system, comprising:
a processor;
a memory communicatively coupled to the processor; and
a program module which executes in the processor from the memory and which, when executed by the processor, causes the computer system to:
at index time, select a term from a master index, the term corresponding to a number of documents greater than a threshold,
select a set of documents that includes the term based on the master index,
determine a rank for each document in the set of documents that contains the term,
assign each document in the set of documents that contains the term to a top document list for the term or a bottom document list for the term based on the rank,
store predefined values of at least part of the rank in the top document list for documents in the top document list and not storing the predefined values of at least part of the rank in the bottom document list for documents in the bottom document list,
at query time, determine whether each query term in a query is common,
upon determining that each query term is common, populate a document result set with at least a subset of documents from the top document list and the bottom document list that satisfy the query, each of the subset of documents occurring in the top document list for at least one term in the query,
upon populating the document result set, retrieve the predefined values from the top document list,
rank the document result set according to a linear model based on the predefined values for documents from the top document list and zero values for documents from the bottom document list, and
transmit a reduced subset of the document result set having the highest linear rank to a ranking function adapted to re-rank the documents in the reduced subset.

20. The computer system of claim 19, wherein the rank comprises a linear rank.

* * * * *